United States Patent [19]
Gerbert-Gaillard et al.

[11] Patent Number: 4,743,715
[45] Date of Patent: May 10, 1988

[54] DRAW-IN AND DRAW-OUT MECHANISM OF AN ELECTRICAL CIRCUIT BREAKER WITH MAIN AND AUXILIARY CIRCUITS

[75] Inventors: Alain Gerbert-Gaillard, Tullins; Jean-Pierre Nebon, St. Martin-le-Vinoux, both of France

[73] Assignee: Merlin Gerin, Grenoble, France

[21] Appl. No.: 10,822

[22] Filed: Feb. 4, 1987

[30] Foreign Application Priority Data

Feb. 10, 1986 [FR] France .................. 86 01880
Feb. 10, 1986 [FR] France .................. 86 01881

[51] Int. Cl.$^4$ ............................................. H01H 9/20
[52] U.S. Cl. ................................. 200/50 AA; 361/337
[58] Field of Search ................. 200/50 AA; 361/336, 361/337

[56] References Cited

U.S. PATENT DOCUMENTS 2,921,998 1/1960 Pokorny et al. ............ 200/50 AA
4,020,301 4/1977 Ericson et al. ............ 200/50 AA

FOREIGN PATENT DOCUMENTS 2165939 7/1973 Fed. Rep. of Germany.
3105261 8/1982 Fed. Rep. of Germany.
911156 11/1962 United Kingdom.

Primary Examiner—Robert S. Macon
Attorney, Agent, or Firm—Parkhurst & Oliff

[57] ABSTRACT

The invention relates to a draw-in mechanism for an extractible molded insulated case circuit breaker, equipped with main and auxiliary circuits with fixed and movable connectors. The fixed connectors are arranged on the upper horizontal wall of the case, and the interacting movable connectors plug into the fixed connectors when the circuit breaker is immobile. The reversible mechanism movement transmission system comprises a first mechanical link with the movable connectors drive device, and a second mechanical link with the movable circuit breaker support, the assembly being arranged so that the first mechanical link is active when the second mechanical link is broken, and vice-versa. The racking mechanism comprises an operating device with a handle, and a movable mechanical support having a pair of symmetrical rails sliding in slide plates of the chassis, and a rail locking system in the drawn-in and drawn-out positions.

10 Claims, 13 Drawing Sheets

DRAW-IN AND DRAW-OUT MECHANISM OF AN ELECTRICAL CIRCUIT BREAKER WITH MAIN AND AUXILIARY CIRCUITS

BACKGROUND OF THE INVENTION

The invention relates to a reversible draw-in and draw-out mechanism for an extractible multipole electrical circuit breaker, equipped with main circuits with terminals and auxiliary circuits associated with a connection device having fixed connectors and interacting movable connectors, the circuit breaker being mounted on a movable mechanical support inside a fixed chassis in the form of a housing having a front opening, two opposite side walls, and a fixed rear support panel for connection of the main terminals of each pole, the mechanical support of the circuit breaker being guided by means of a pair of slide plates symmetrically fixed to the side walls of the chassis and extending parallel in the longitudinal draw-in direction, said mechanism comprising an operating device associated with a movement transmission system capable of occupying a first "draw-in" position in which the main and auxiliary circuits of the circuit breaker are connected, a second "test" position in which the main circuits are disconnected and the auxiliary circuits are connected, and a third "drawn-out" position in which the main and auxiliary circuits are disconnected.

According to a state of the art draw-out circuit breaker of the kind mentioned, one of the auxiliary circuit connectors is fixed to the circuit breaker on the same wall through which the main circuit terminals pass, and the interacting connector is securely attached to the connection support panel. Connection and disconnection of the auxiliary circuit connectors take place in the direction of movement of the circuit breaker. The movement transmission system forms a permanent desmodromic link between the operating device and the movable mechanical support of the circuit breaker. In the course of actuation of the mechanism, the circuit breaker occupies three distinct positions, staggered along the longitudinal draw-in direction. Each position of the circuit breaker corresponds to one of the drawn-in, test or drawn-out positions of the main and auxiliary circuits. The presence of these three positions gives rise to an increased draw-in travel and opposite draw-out travel and results in the chassis having large dimensions.

Most draw-out circuit breakers comprise in addition a fixed chassis equiped with the connection support panel and a pair of retractable rails on which rolling parts securely united to the circuit breaker can run. The latter is generally surrounded by an auxiliary metal frame whose opposite side walls support the rolling parts, the whole assembly being able to move inside the fixed chassis when the racking mechanism is actuated. The presence of this auxiliary metal frame complicates fitting of the circuit breaker guiding and locking means, and contributes to increasing the price and weight of the apparatus.

A first object of the present invention is to reduce the travel of the draw-out circuit breaker in order to reduce the dimensions of the chassis.

A second object of the present invention is to simplify the support and locking devices of a draw-out circuit breaker.

SUMMARY OF THE INVENTION

The mechanism according to the invention is characterized by the fact that the fixed connectors of the auxiliary circuits connection device are securely united to the circuit breaker and that the movement transmission system of the reversible mechanism comprises a first mechanical link between the operating device and a drive device of the movable connectors of the connection device during the actuation phase corresponding to the interval provided between the second and third positions, and a second mechanical link between the operating device and a coupling device of the movable mechanical support of the circuit breaker during another actuation phase corresponding to the interval provided between the second and first positions, the assembly being arranged so that the first mechanical link is active when the second mechanical link is broken, and vice-versa, enabling the fixed and movable connectors of the auxiliary circuits to be connected or disconnected when the circuit breaker remains immobile. The draw-in mechanism both allows the circuit breaker to be moved between the drawn-in and drawn-out with test positions and enables the drive device of the movable connectors to be actuated when the circuit breaker is not moving.

The fixed connectors of the connection device are advantageously located on one of the upper or lower horizontal faces of the insulated case housing the circuit breaker. The drive device is arranged so as to cause a vertical translation movement of the movable connectors when the first mechanical link is made and the second mechanical link is broken, said movement being perpendicular to the longitudinal draw-in or draw-out direction of the main circuits of the circuit breaker.

The circuit breaker rests on a simplified mechanical support comprising a pair of rails capable of sliding in symmetrical slide plates of the chassis, the coupling device of the second mechanical link being fixed on a flange securedly united to each rail. In the drawn-in position, the circuit breaker is positively locked by the slide plates.

The fixed connectors of the complementary connection device are electrically connected to the electronic trip release incorporated in the circuit breaker, and the various electrical auxiliaries for measuring, monitoring and indication. In the drawn-in position, and in the test position, the movable connectors are plugged into the fixed connectors to enable information to be picked up and orders to be sent to the electrical auxiliaries and the trip release.

The different states of the main and auxiliary circuits are indicated by means of a position indicator located on the front face on a fixed escutcheon.

The movable mechanical circuit breaker support comprises:

a pair of symmetrical rails mounted with longitudinal sliding in the corresponding slide plates fixed to the opposite side walls of the chassis, the circuit breaker having at least one latching device positioned in an interacting device of each rail, a locking system equipped with a locking device operating in conjunction with rail retaining means to ensure mechanical locking of the circuit breaker in the slide plates in the drawn-in and drawn-out positions, said locking device being securedly united to an operating lever pivotally mounted on a spindle of the chassis.

and a first mechanical link between said operating lever and an extraction hand-grip, capable of causing unlatching of the locking system by unlocking the locking device and the retaining means.

A mechanical support of this kind does not require any auxiliary metal frame. The circuit breaker is of the molded insulated case type, and is simply placed on the two rails, the assembly then being able to slide in the corresponding slide plates of the fixed chassis.

Unlocking of the locking system takes place in the drawn-in position and in the drawn-out position by manual withdrawal of the extraction hand-grip when the first mechanical link is made.

A second mechanical link is arranged between the operating device transmission system and said operating lever to ensure forced tripping of the circuit breaker when the mechanical support is moved from the drawn-in position to the drawn-out position.

The rail retaining means comprise a main latch and an auxiliary groove longitudinally staggered in relation to one another to form respectively a first positive two-way locking of the movable support when the circuit breaker reaches the drawn-in position, and a second one-way latching of said support in the drawn-out position preventing the circuit breaker from being extracted, but allowing it to be drawn-in.

The rear end of each rail is advantageously bevelled to operate in conjunction with an actuating device of the insulating shutters, comprising a pair of operating jaws articulated on a spindle supported by a side wall of the chassis.

A plurality of auxiliary safety devices are located in an escutcheon of the chassis, and operate in conjunction with a main locking bolt capable of preventing the operating device from being actuated by means of the handle.

The handle is articulated in several parts, and can be stored in a fixed sleeve longitudinally aligned with an orifice of the escutcheon.

BRIEF DESCRIPTION OF THE DRAWINGS

Other advantages and characteristics will become more clearly apparent from the following description of an embodiment of the invention, given as an example only, and represented in the accompanying drawings, in which:

FIGS. 4 to 6 are identical views of the mechanism in FIG. 2, respectively in the test and drawn-in positions of the circuit breaker;

FIG. 15 is a detailed view, on an enlarged scale, of an operating cam of the actuating device according to FIG. 13;

DESCRIPTION OF THE PREFERRED EMBODIMENT

Figure 10:
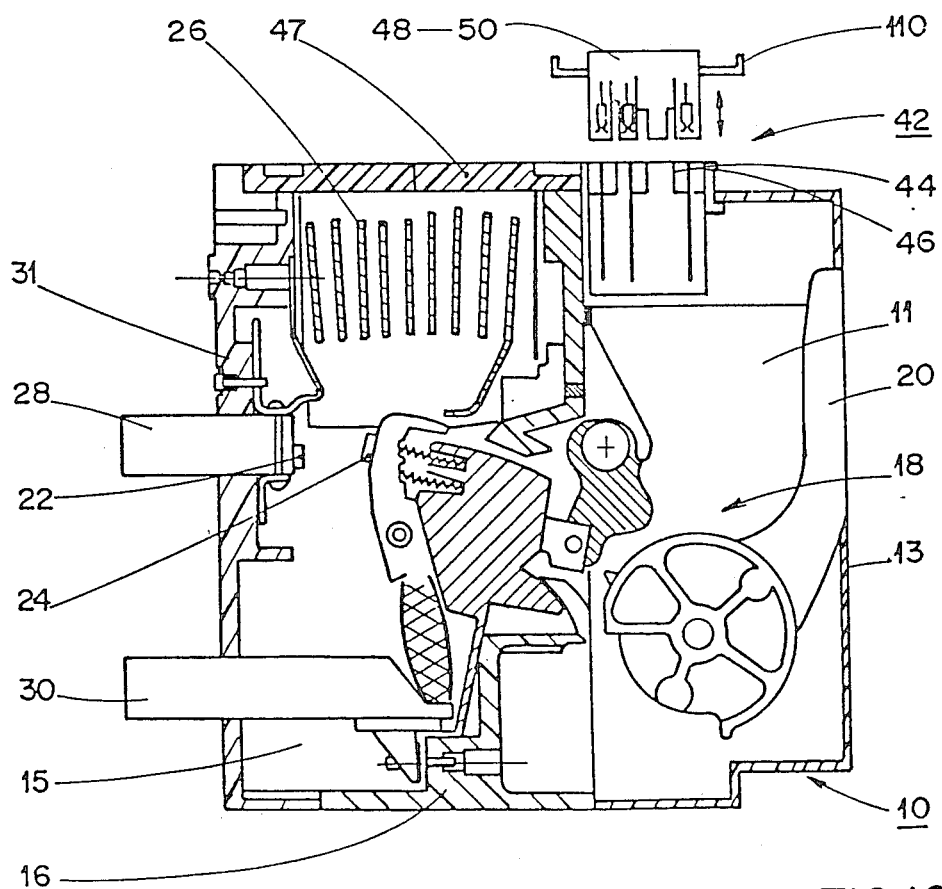
FIG. 10 is a sectional view of the circuit breaker equipped with the connection device according to the invention.

In the figures, an electrical switchgear device withdrawable at low voltage comprises a draw-out multipole circuit breaker 10 mounted on a mechanical support 12 movable in translation inside a fixed chassis 14 in the form of a parallelipipedic housing. The circuit breaker (FIGS. 7 and 10) of high ratings, notably up to 4000 Amps, is housed in a case 16 made of insulating material subdivided into a front compartment 11 located near the front face 13 and a rear compartment 15 housing the different poles. The front compartment 11 houses an operating device 18 with a charging lever 20 of an energy storage spring system (not shown), an electronic trip release 17 causing automatic tripping when a fault current, notably an overload, a short-circuit or an earth fault occurs, and electrical measuring signalling and monitoring auxiliaries 19, notably auxiliary contacts indicating a trip or the status of the circuit breaker, an undervoltage MN and/or shunt trip MX voltage trip release, etc. . . . Each pole of the rear compartment 15 comprises a system of breaking contacts 22, 24, one of which is fixed and the other movable, an arc chute 26, and a pair of main terminals 28, 30, protruding from the rear face 31 of the case 16. The internal arrangement and operation of the circuit breaker 10 are dealt with in detail in French patent applications Nos. 8,516,345, 8,516,346 and 8,516,347 filed on 31/10/1985 by the applicant.

The rear panel of the chassis 14 is arranged as an insulated connection support 32 (FIGS. 1, 3, 5 and 9), through which pass fixed terminal pads 34, 36 equipped with disconnect contacts 38, 40. In the drawn-in position (FIG. 5) of the circuit breaker 10, the main terminals 28, 30 are engaged with the disconnect contacts 38, 40 to carry the current flowing in the active conductors of the network. The structure of connection support panel 32 is described in detail in French patent application No. 8,508,597, filed on 5/06/1985 by the applicant. In addition to the main terminals 28, 30, the circuit breaker 10 comprises a complementary connection device, designated by the general reference 42, capable of making or breaking the electrical link between the auxiliaries 19 and the trip release 17 on the one hand, and external remote control and monitoring-means on the other hand. The connection device 42 (FIG. 7) is fitted with a first fixed connector 44 connected by wiring conductors 45 to the different electrical auxiliaries 19, and with a second fixed connector 46 connected to the electronic trip release 17. The two fixed connectors 44, 46 located on the upper wall 47 of the case 16 at the level of the front compartment 11 of the circuit breaker 10, are accessible without disassembling the case 16, and cooperate by plugging into movable connectors 48, 50 associated with a bundle of external electrical connections. The fixed connectors 44, 46 on the circuit breaker 10 are of the male-contact type, whereas the movable contacts 48, 50 are of the opposite female-contact type, or vice-versa.

Figure 9:
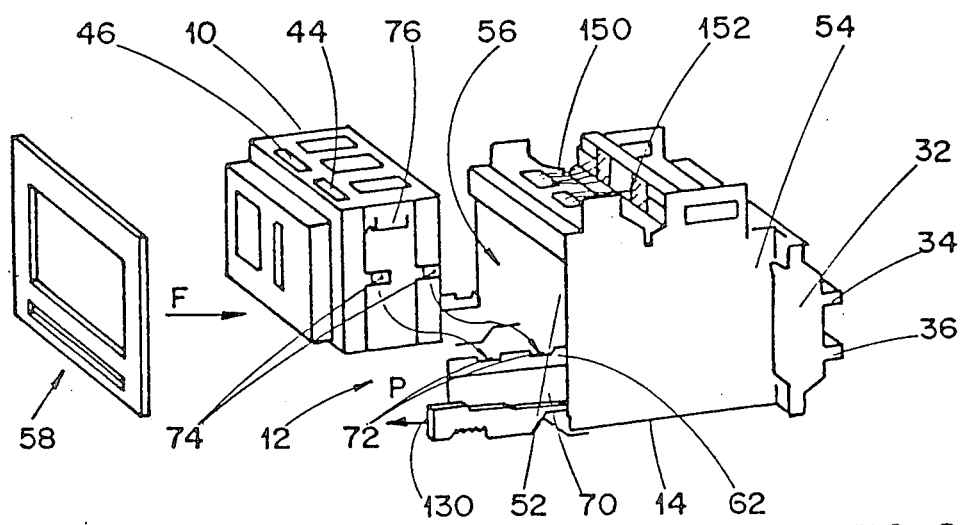
FIG. 9 is an exploded perspective view of the sub-assembly comprising the circuit breaker and the chassis.
Figure 12:
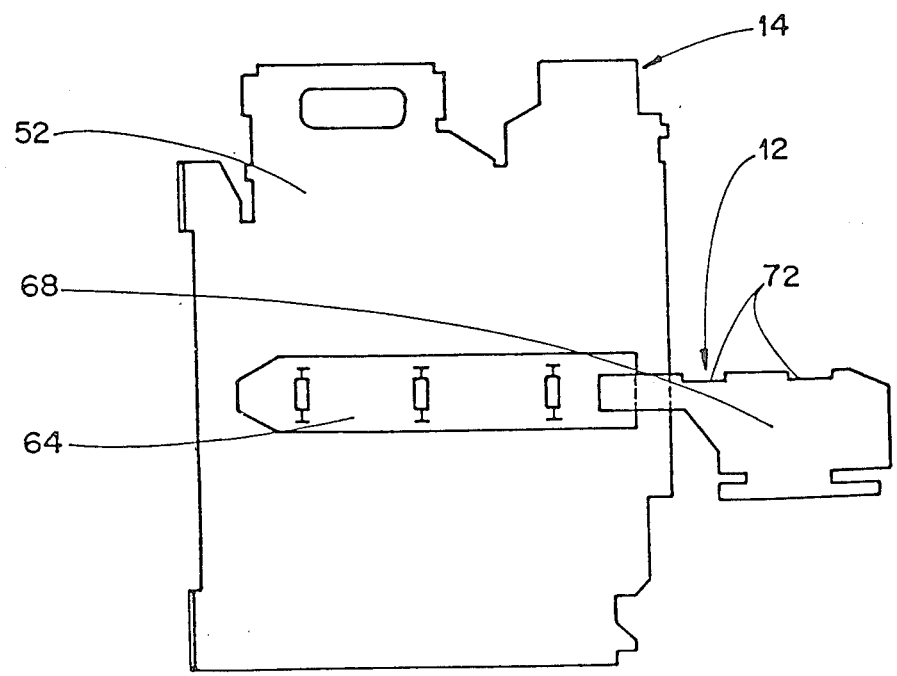

The metal chassis 14 forming a housing comprises a base plate 51 and two opposite side walls 52, 54 (FIGS. 7, 8, 9 and 14) bounding a front opening 56 for insertion or withdrawal of the draw-out switchgear. The opening 56 can be blanked off by a door 58 when the circuit breaker 10 is in service. Opposite the front opening 56 there is the connection support panel 32 of the circuit breaker 10. The movable mechanical support 12 of the circuit breaker 10 is equipped with a pair of rails 60, 62, capable of sliding in two symmetrical slide plates 64, 66 fixed at mid-height to the corresponding side walls 52, 54 of the chassis 14. To each rail 60, 62, there is fixedly secured a flange or arm 68, 70, the upper edge of which presents two positioning notches 72 operating in conjunction with interacting latching parts 74 disposed on the opposing side faces of the case 16 of the circuit breaker 10. The latter also comprises a pair of gripping edges 76 enabling the circuit breaker 10 to be fitted onto the movable flanges 68, 70 when the rails 60, 62 are in the extraction position (FIGS. 9 and 12).

A racking mechanism 78 (FIGS. 2, 4, 6, 8 and 13) comprises a crown-wheel device 80 operating in conjunction with an operating screw able to be actuated in rotation by means of a racking handle 84 from the front face of the chassis 14. The crown-wheel device 80 drives transmission pinions 86 keyed onto a rotating shaft 88 extending transversely in relation to the translation movement of the crown-wheel 80. At the opposite ends of the transverse shaft 88, there are two operating cams 90, 92, designed to cooperate on the one hand with a drive device 94 of the movable connectors 48, 50, forming part of the complementary connection device 42, and on the other hand with coupling means 96 fixed to the movable support flanges 68, 70 of the circuit breaker 10.

The drive device 94 of the movable connectors 48, 50, is symmetrical in relation to the mid-plane of the chassis 10 and comprises at the level of each cam 90, 92, an intermediate lever 98 pivotally mounted on a spindle 100 fixedly secured to the corresponding side wall 52, 54. One of the ends of the lever 98 is provided with a groove 102 in which a pin 104 associated with each cam 90, 92 can engage (see FIGS. 13 and 14). Opposite the groove 102, each lever 98 is articulated at a point 106 to a vertical rod 108 capable of moving along the corresponding side wall 52, 54. The connectors 48, 50 are supported by a common cross-piece 110, connected to the two symmetrical rods 108 of the drive device 94. The cross-piece 110 extends parallel to the shaft 88, and is animated with a vertical translation movement when the male 44, 46 and female connectors 48, 50 of the device 42 are plugged in or disconnected. The opposite ends of the cross-piece 110 move in an aperture 112 arranged in the side walls 52, 54, the height h (FIG. 7) of each aperture 112 corresponding appreciably to the draw-in travel of the complementary connection device 42. The upper part of each rod 108 presents an extension 114 having a slot 116 in which the corresponding edge of the cross-piece 110 is inserted with clearance. The length of the slot 116 is greater than the depth of the cross-piece 110, and is appreciably identical to the length 1 of the aperture 112 corresponding to the longitudinal draw-in or draw-out travel of the circuit breaker 10 (FIG. 14).

The coupling means 96 of each movable flange 68, 70 with the mechanism 78 is formed for example by a spindle capped by a roller cooperating with a notch 118 of the corresponding cam 90, 92 when movement of the crown-wheel 80 occurs.

Figure 11:
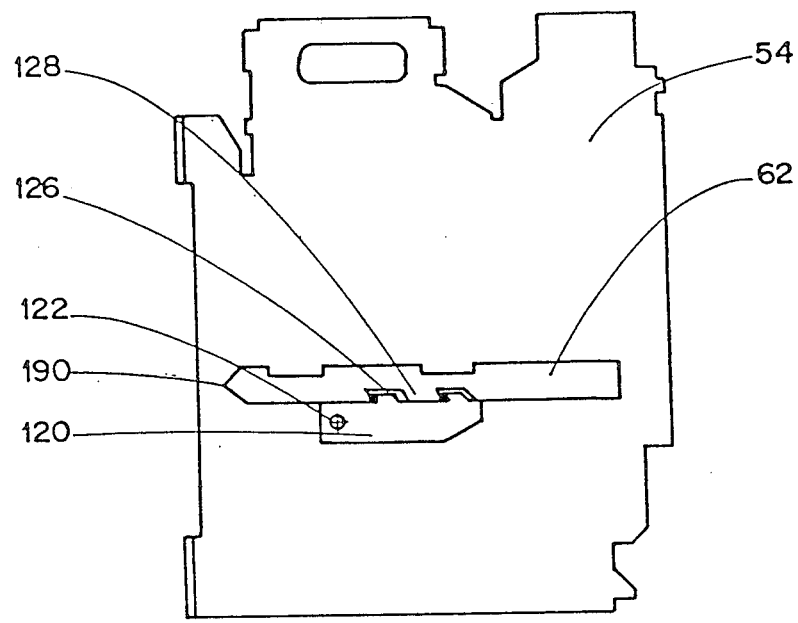
FIGS. 11 and 12 show the movable mechanical support of the circuit breaker, respectively in the drawn-in and extraction positions.
Figure 14:
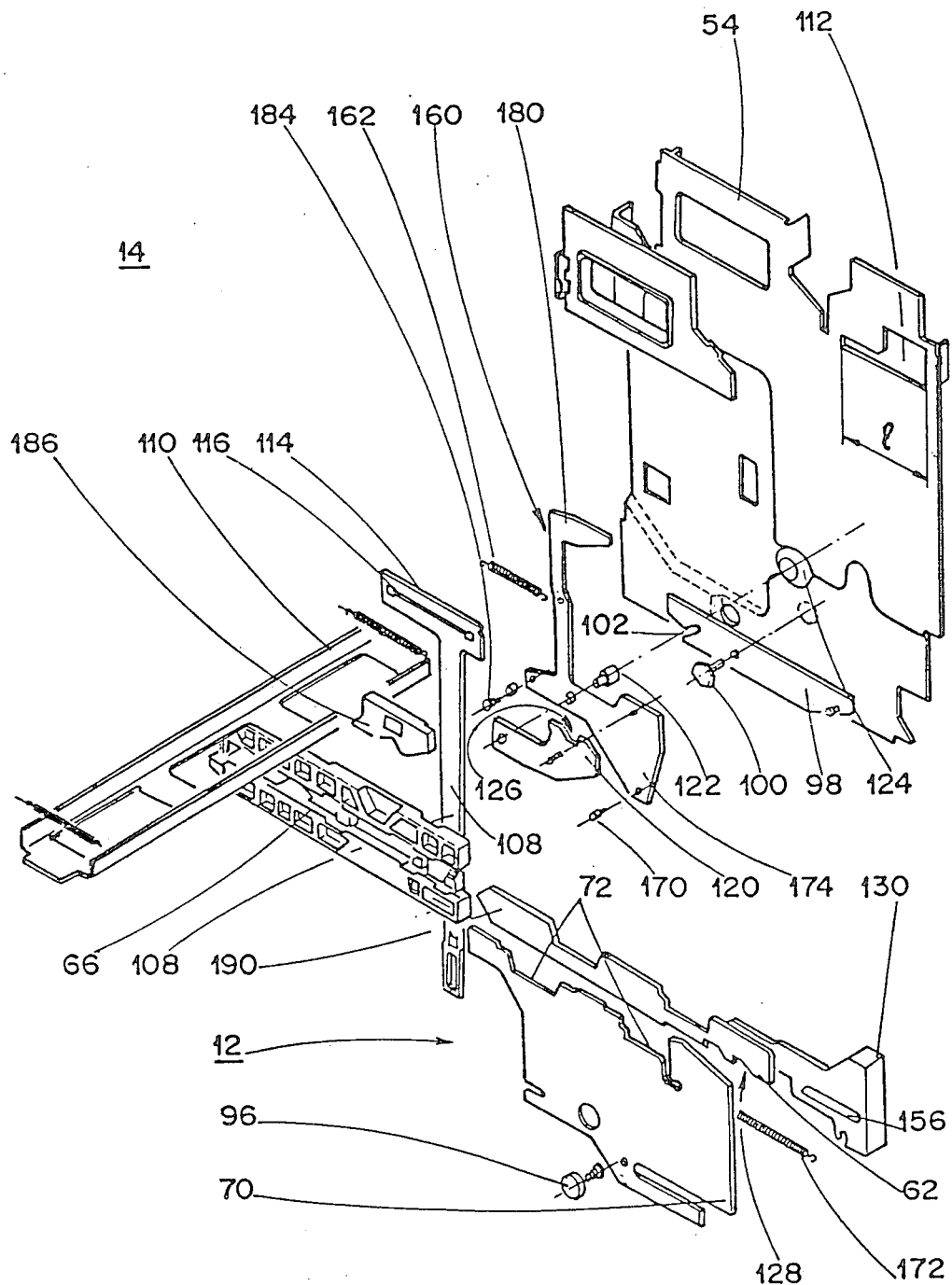
FIG. 14 shows an exploded perspective view of another part of the draw-in mechanism, showing the movable circuit breaker support and the drive device of the movable connectors.

A locking device 120, mounted with limited rotation on a spindle 122 in a bearing 124 of each side wall 52, 54, comprises a retaining latch 126 capable of engaging in an interacting latch 128 of the rails 60, 62, when the circuit breaker 10 is in the drawn-in position (FIGS. 11 and 14). The circuit breaker is then positively locked by the slide plates 64, 66. An extraction hand-grip 130 (FIG. 14) is coupled to each rail 60, 62 to provide unlocking of the latch when the switchgear unit is withdrawn.

In FIG. 15 there is represented in detail the structure of an operating cam 90, 92. The notch 118 is off-centre in relation to the transverse axis of the rotating shaft 88. The cam 90, 92 comprises a first circular peripheral edge 134 on the axis of the shaft 88, and cooperating by contact with the coupling roller 96 when the racking mechanism 78 is operational between the drawn-out position and the test position. The internal part of the notch 118 is bounded by a second straight edge 136 acting as a stop for the coupling roller 96 in the test position. A third active edge 138 of the notch 118 is capable of driving the coupling roller 96 of each movable flange 68, 70 from the test position to the drawn-in position.

The different phases of operation of the racking mechanism 78 of the draw-out electrical switchgear device are illustrated in FIGS. 1 to 9:

in FIG. 9 assembly of the circuit breaker 10 on the rails 60, 62 of the chassis 14 is represented. After the movable flanges 68, 70 and the rails 60, 62 have been removed from the slide plates 64, 66 as far as possible (direction of the arrow P), the circuit breaker 10 is installed on the rails 60, 62, after the latching parts 74 have been engaged in the positioning notches 72. The operator uses the gripping edges 76 of the case 16 to fit the circuit breaker 10. The right-hand half-view in FIG.

7 shows installation of the circuit breaker 10 on the movable flanges 68, 70, in the extraction position.

Figure 7:
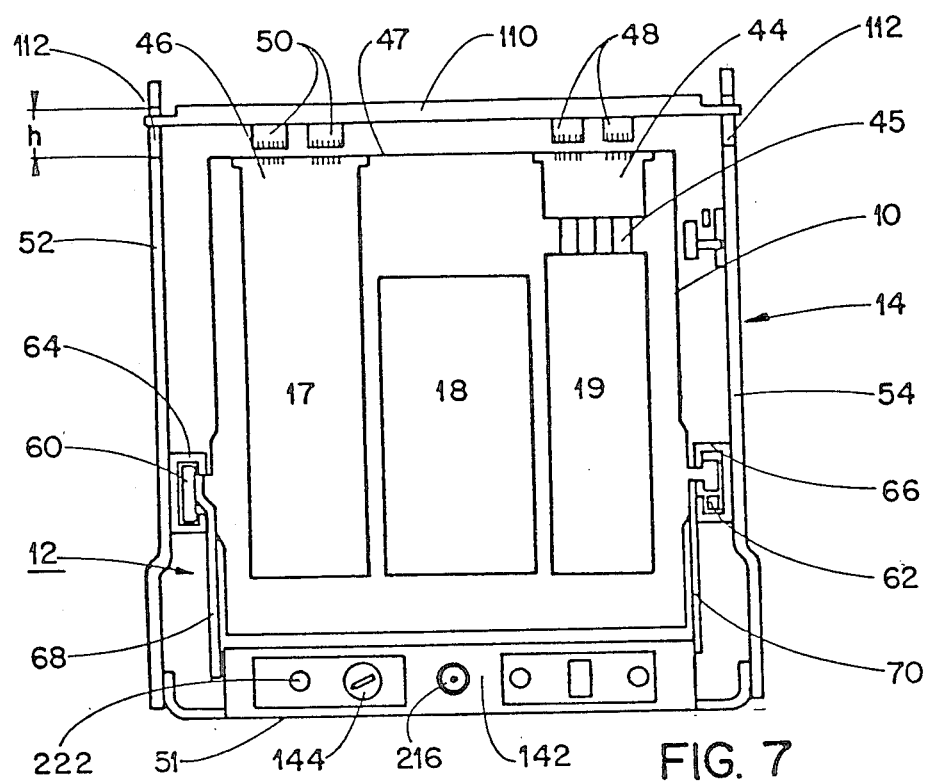
FIG. 7 is a front view of the chassis after the circuit breaker has been fitted on the movable mechanical support, the right-hand half-view showing the circuit breaker in the extraction position, and the left-hand half-view representing the circuit breaker after insertion in the chassis.
Figure 8:
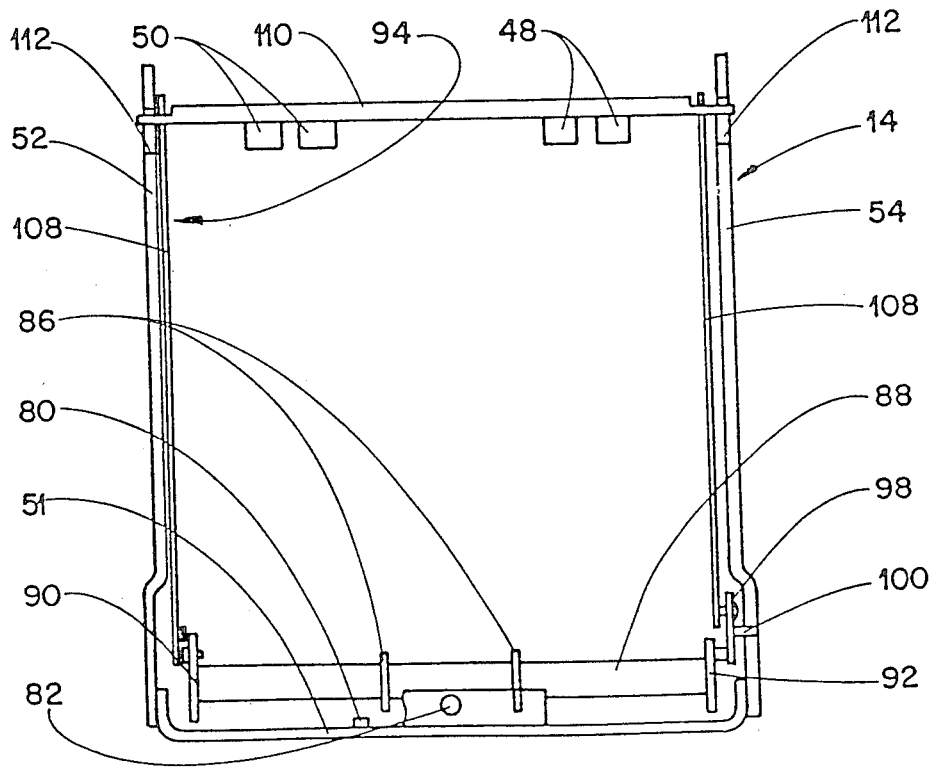
FIG. 8 is a front view of the chassis showing the operating device and the transmission system with the movable connectors of the connection device, the latter being represented in the disconnected position.

The circuit breaker 10 can then by pushed back in the direction of the arrow F inside the chassis 14. The left-hand half-view in FIG. 7 represents insertion of the rails 60, 62 in the associated slide plates 64, 66.

In the drawn-out position of the circuit breaker 10 (FIGS. 1 and 2), the main terminals 28, 30 are separated from the disconnect contacts 38, 40 of the connection support panel 32. The same is true of the fixed 44, 46 and movable connectors 48, 50 of the complementary connection device 42, the cross-piece 110 being raised to the upper position (FIGS. 7 and 8) by the rod 108 of the drive device 94. The roller of the coupling means 96 of the movable flanges 68, 70 is stopped up against the first edge 134 of each operating cam 90, 92. The transmission pin 104 is inserted in the groove 102 of each lever 98 of the device 94.

Figure 5:
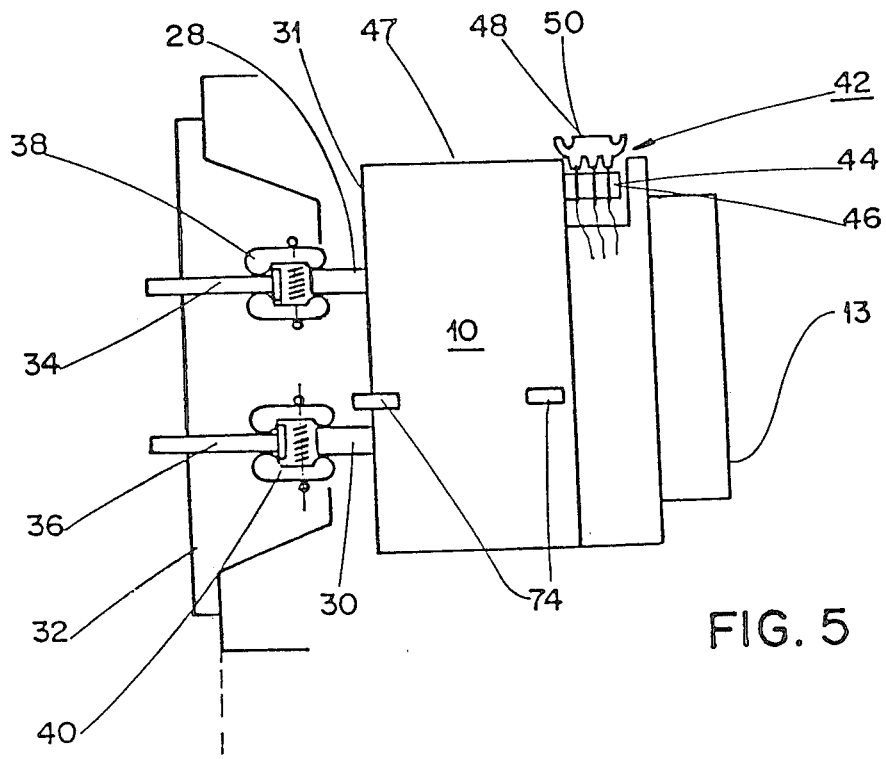
Figure 6:
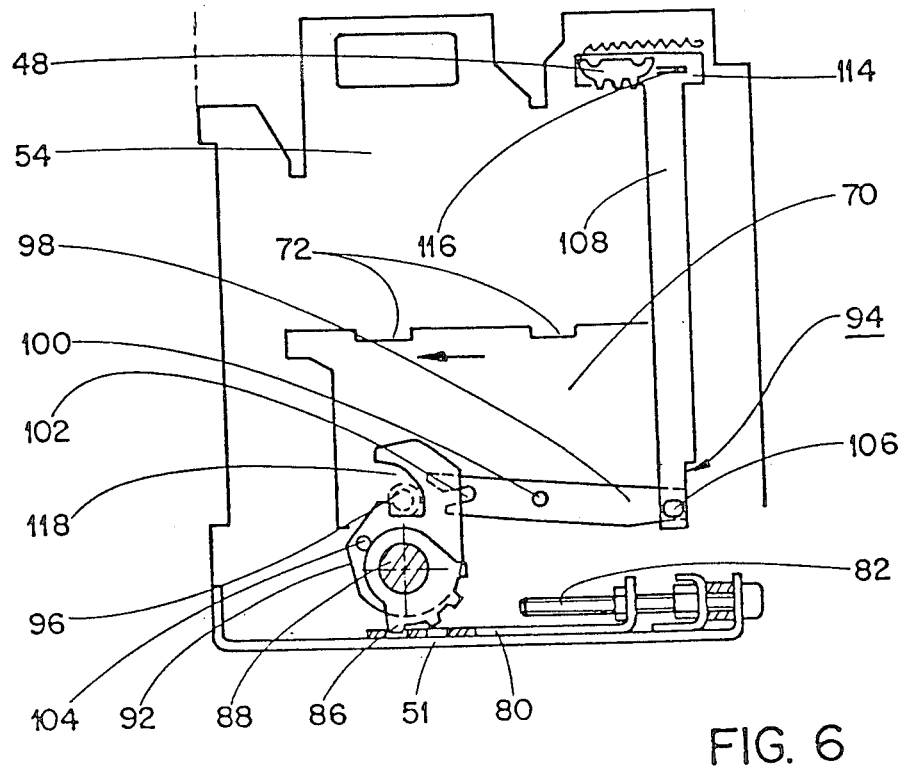

The draw-in operation of the circuit breaker 10 takes place in two one-way actuation phases of the racking handle 84, which brings the crown-wheel device 80 successively into an intermediate test position (FIGS. 3 and 4) and then into a final drawn-in position (FIGS. 5 and 6).

Moving the handle 84 to the test position (FIGS. 3 and 4) causes an initial clockwise rotation movement of the operating screw 82, causing a longitudinal translation movement of the crown-wheel device 80 towards the front face 13. This results in a counterclockwise rotation movement of the cams 90, 92, and an opposite pivoting movement of the levers 98 causing lowering of the rods 108 of the drive device 94 of the cross-piece 110. The movable connectors 48, 50, fixedly secured to the cross-piece 110 are plugged into the corresponding male connectors 44, 46 of the circuit breaker 10 during this first actuation phase of the handle 84. The position of the circuit breaker 10 has not been modified and corresponds to the initial position in FIGS. 1 and 2, as the movable flanges 68, 70 have not moved in translation. The second straight edge 136 of the notch 118 disposed inside each cam 90, 92 comes into contact with the coupling roller 96 which also remains immobile up to the test position.

From the test position, further clockwise actuation of the handle 84 causes a maximum advance of the crown-wheel device 80 towards the front face 13, and a counterclockwise rotation movement of the cams 90, 92. The third edge 138 of each cam 90, 92 drives the coupling means roller 96, and the movable flanges 68, 70 move the circuit breaker 10 in translation until the main circuit is engaged by insertion of the terminals 28, 30 in the disconnect contacts 38, 40 (FIGS. 5 and 6). During this second actuation phase of the handle 84 and the screw 82 in rotation, the pin 104 is released from the groove 102 arranged in each lever 98, and breaks the mechanical connection with the rods 108 of the drive device 94 which remains immobile. The fixed 44, 46 and movable connectors 48, 50 remain in the connected position, but are driven in translation by the circuit breaker 10 towards the drawn-in position, due to the free sliding of the cross-piece 110 in the straight slot 116 of the rods 108.

The racking mechanism 78 enables both the circuit breaker 10 to be moved between the drawn-in and drawn-out positions, and the drive device 94 of the movable connectors 48, 50 to be actuated.

Figure 1:
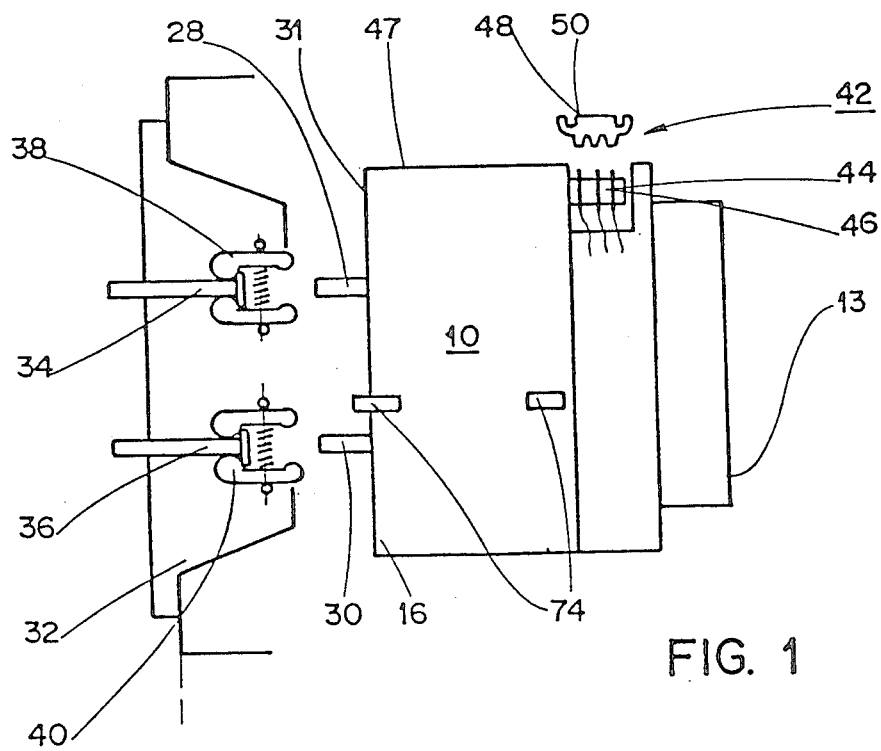
FIG. 1 shows a schematic side view of the circuit breaker in the drawn-out position.
Figure 2:
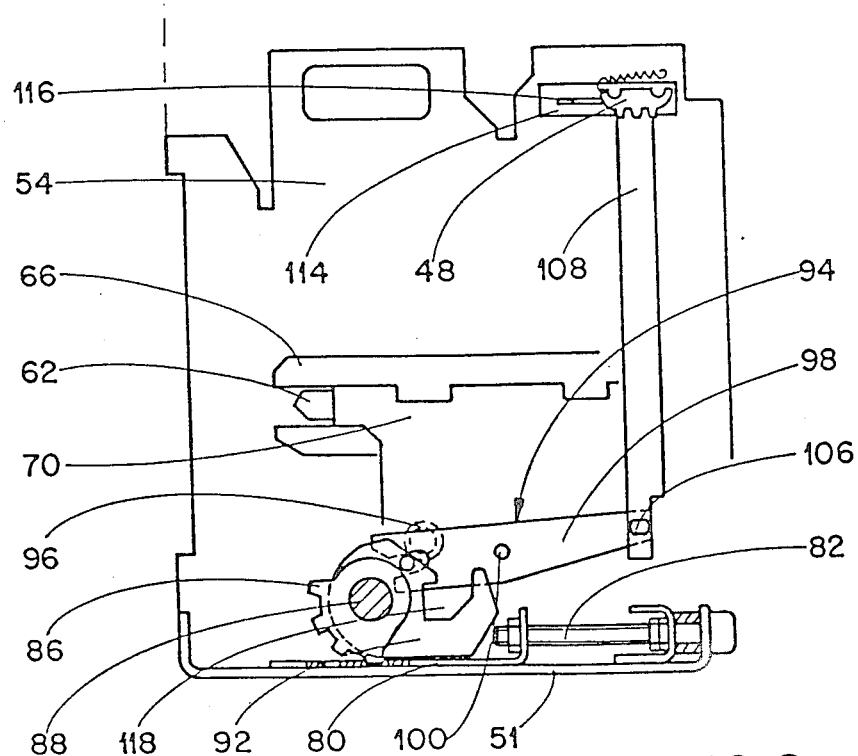
FIG. 2 represents a side view of the draw-in mechanism in the drawn-out position of the circuit breaker according to FIG. 1.
Figure 3:
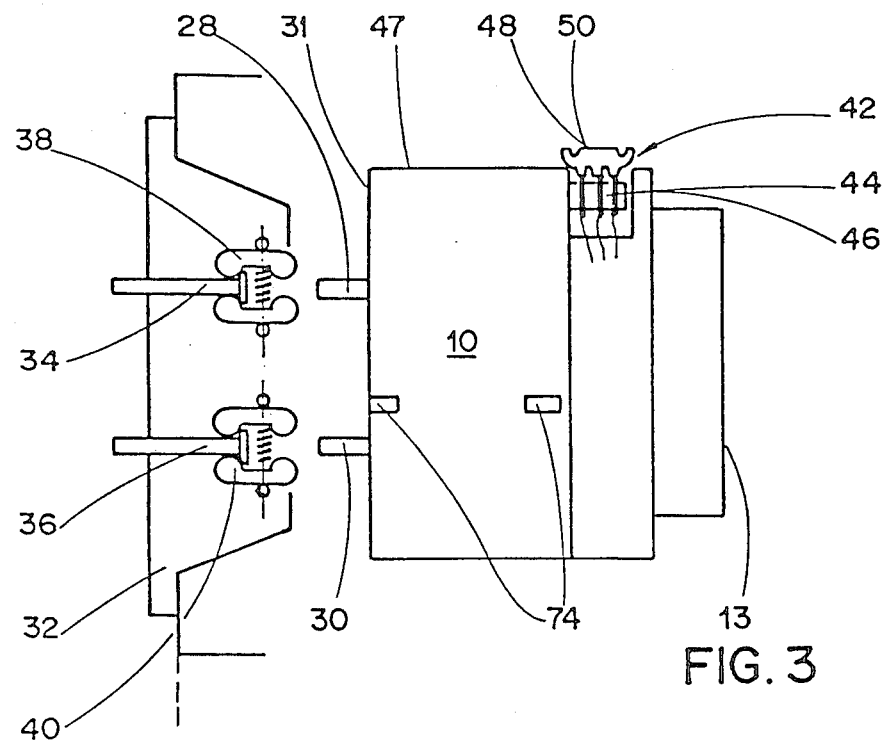
FIGS. 3 to 5 are identical views to FIG. 1, respectively in the test and drawn-in positions of the circuit breaker.
Figure 4:
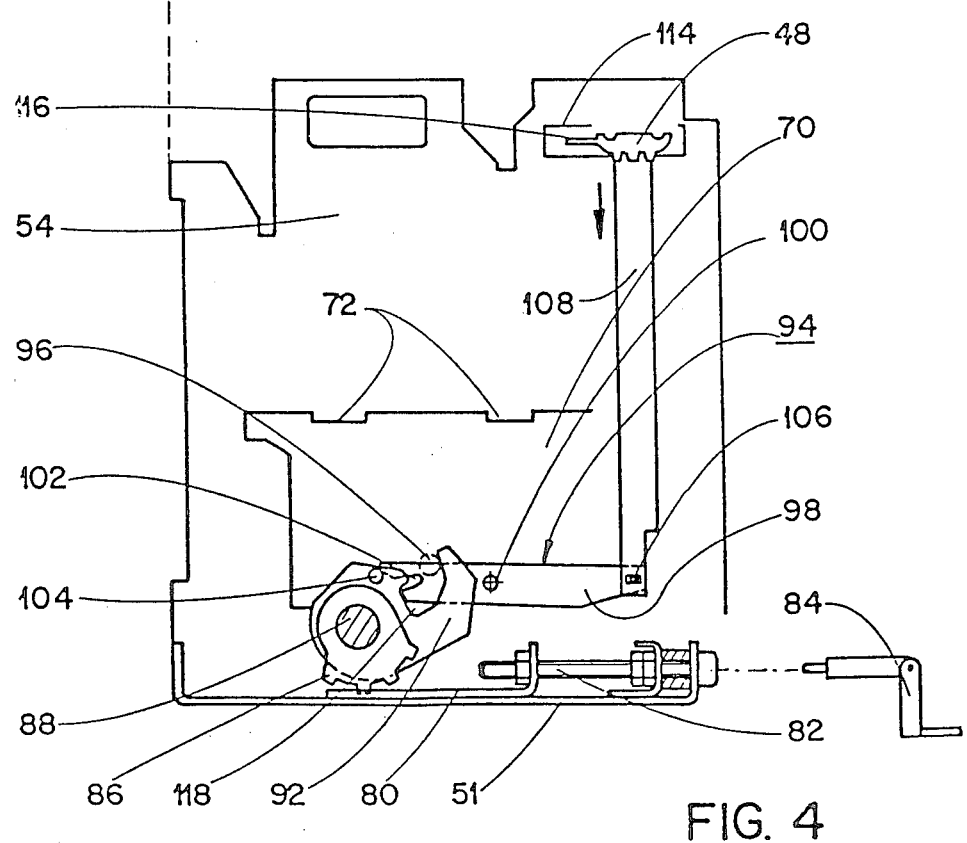

The circuit breaker 10 occupies two distinct positions staggered along the longitudinal draw-in direction: a first drawn-in position (FIG. 5) and a second drawn-out position with or without test (FIGS. 3 and 1). The circuit breaker 10 remains immobile in the second position when the movable connectors 48, 50 engage or disengage from the corresponding fixed connectors 44, 46. In the first drawn-in position (FIG. 5) and the second drawn-out position with test (FIG. 3), the complementary connection device 42 is active, and enables information to be picked up and order to be sent to the electrical auxiliaries 19 and the electronic trip release 17 of the circuit breaker 10.

Withdrawing the circuit breaker 10 from the first drawn-in position (FIG. 5) to the second drawn-out position without test (FIG. 1) is performed in the reverse direction from drawing-in, by turning the handle 84 counterclockwise. In the first withdrawal phase, the circuit breaker 10 is driven by the cams 90, 92 to the drawn-out position with test, in which the movable connectors 48, 50 of the connection device 42 remain plugged into the fixed connectors 44, 46. Further rotation of the handle 84 during the second withdrawal phase causes the connectors (44 to 50) to be disconnected without any movement of the circuit breaker 10.

The reversible vertical translation movement of the cross-piece 110 supporting the movable connectors 48, 50 takes place either at the beginning of the draw-in travel, or at the end of the draw-out travel of the mechanism 78, and extends perpendicularly to the longitudinal direction of the rails 60, 62 of the chassis 14. In the example described, connection and disconnection of the connection device 42 are performed on the upper wall of the case 16, but it is clear that the connection device 42 could be arranged on the opposite lower side.

A rotating position indicator 140 (FIG. 13) is located on the front face on a fixed escutcheon 142 to indicate the different states of the main and auxiliary circuits of the circuit breaker 10:

"drawn-in" position 1 corresponds to FIG. 5 in which the main and auxiliary circuits are connected.

"test" position 2 corresponds to FIG. 3 in which the main circuits are disconnected and the auxiliary circuits are connected. The circuit breaker 10 can then be handled normally and enables all the operating sequences to be checked, "drawn-out" position 3 corresponds to FIG. 1 in which the main and auxiliary circuits are disconnected.

The rotating indicator 140 comprises a front indicator 144 extended by a rod 146 having a helicoidal thread cooperating with a nut 148 securedly attached to the crown-wheel device 80. When the operating screw 82 is actuated by the handle 84, the translation movement of the crown-wheel device 80 is transformed into a rotation movement of the rod 146 of the indicator 140.

Figure 21:
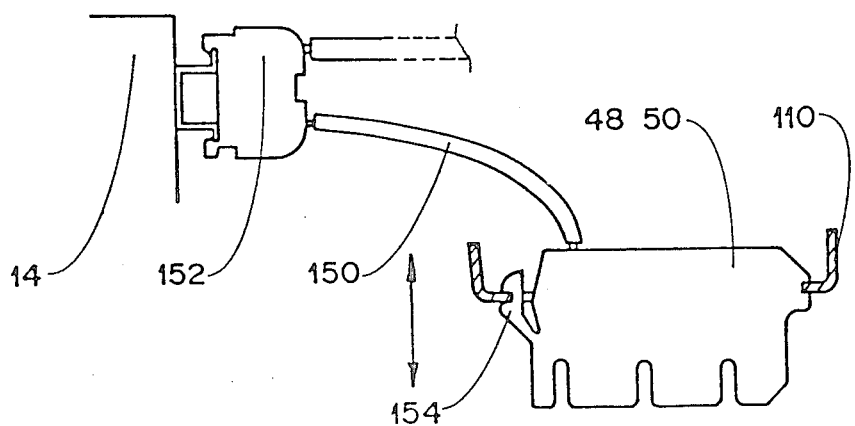
FIG. 21 shows the electrical connection of the movable connectors to a fixed terminal accessible to the user.

The movable connectors 48, 50 of the connection device 42 are connected by connecting wires 150 to a connection terminal 152, fixed onto a rail of the chassis 14 and accessible to the user (FIGS. 21 and 9). Each connector 48, 50 is housed in an insulated case clipped onto the cross-piece 110 by means of an elastic retaining lug 154.

Figure 16:
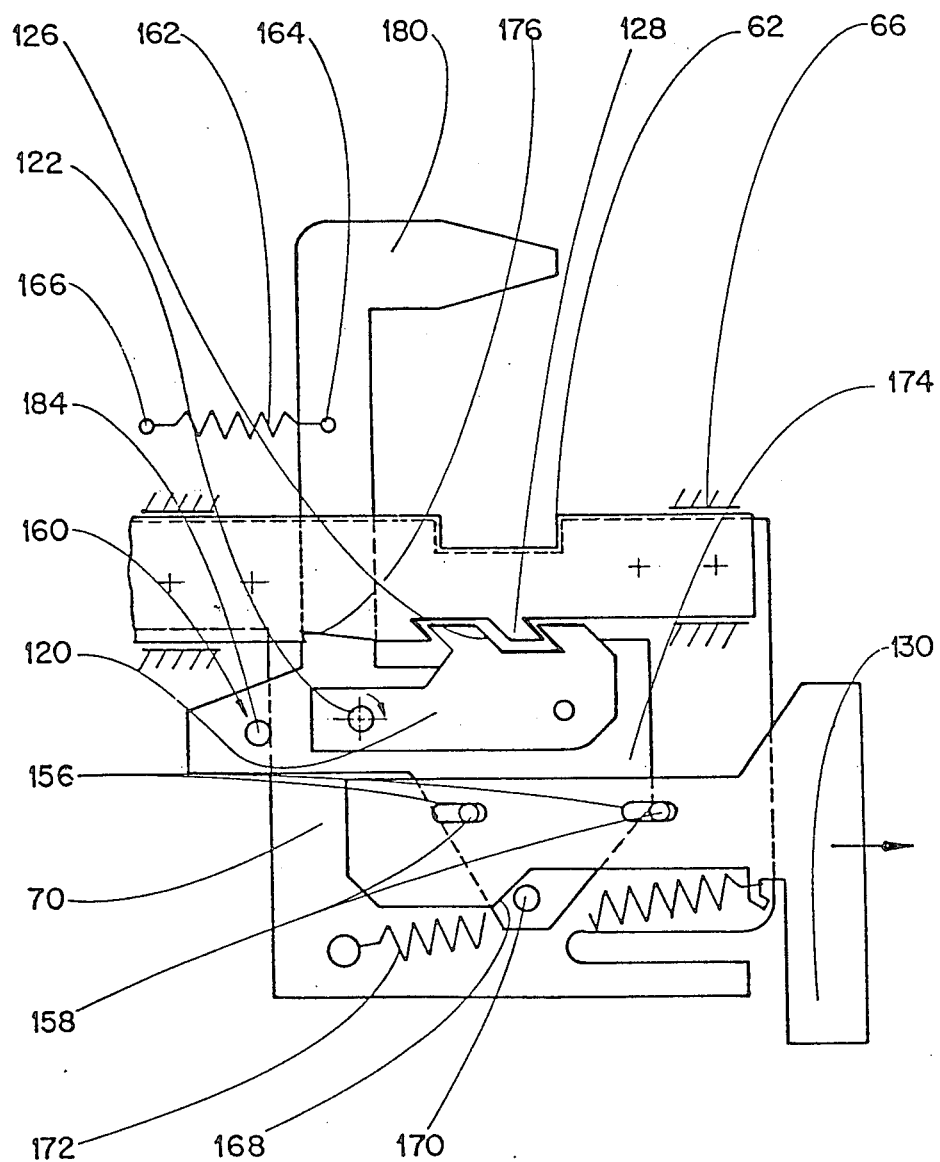
FIGS. 16 and 17 represent side views of the circuit breaker locking system, respectively in the drawn-in and drawn-out positions.
Figure 17:
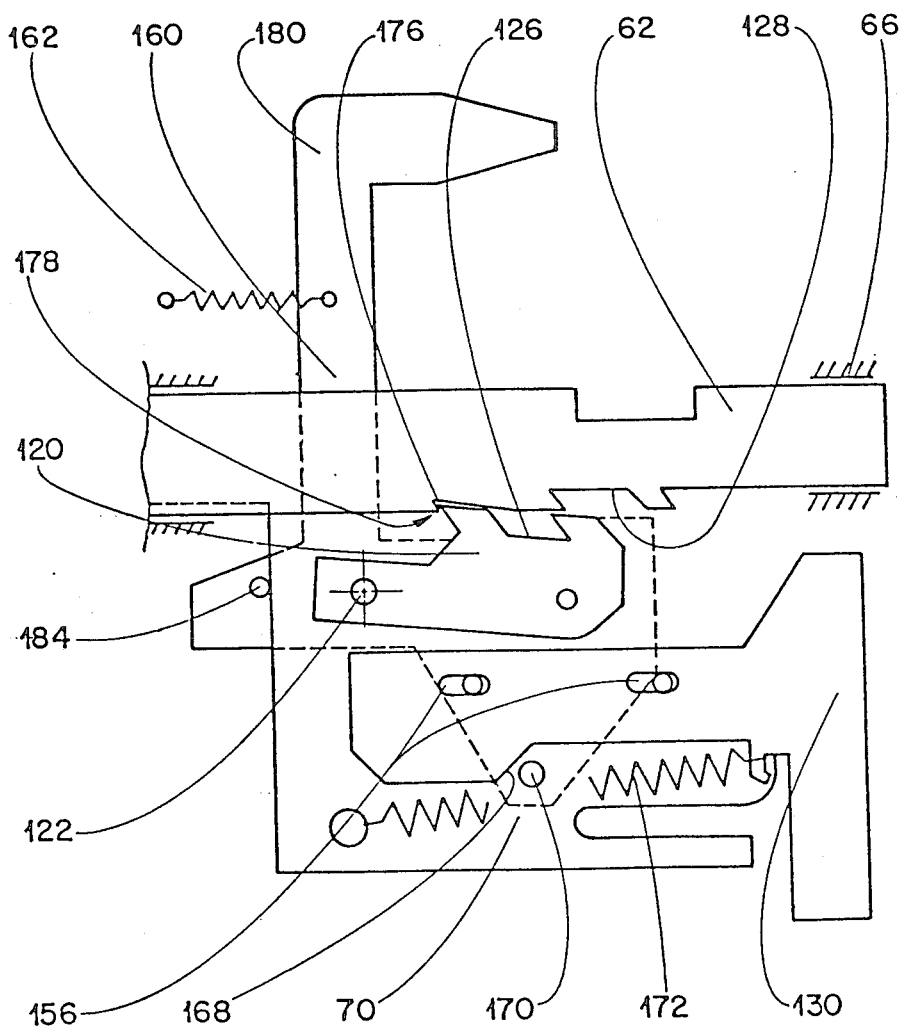

Each extraction hand-grip 130 comprises two oblong openings 156 capable of sliding longitudinally on two pins 158 of the corresponding movable flange 68, 70 (FIGS. 14, 16 and 17). The locking device 120 with latch 126 is fixedly secured by riveting to an operating lever 160 mounted with pivoting on the same spindle 122. A return spring 162 is secured between a point 164 of the operating lever 160 and a fixed point 166 of the chassis 14, and biases the lever 160 and locking device 120 assembly counterclockwise towards the active position, permitting automatic engagement of the retaining latch 126 in the interacting latch 128 of the rail 60, 62, when the circuit breaker 10 reaches the drawn-in position (FIG. 16). Each extraction hand-grip 130 is in addition equipped with an unlocking ramp 168 capable of cooperating with a pin 170 of the operating lever 160 when the user exerts a pulling force on the hand-grip 130 in against a return spring 172. Actuating the hand-grip 130 in translation causes a pivoting movement of the operating lever 160, and separation of the latches 126, 128 to a unlocked position, enabling the circuit breaker 10 to be withdrawn to the extraction position. The pin 170 is disposed on a lower arm 174 of the lever 160.

In addition to the main latch 128, each rail 60, 62 comprises a longitudinally staggered auxiliary notch 176 (FIG. 17) cooperating by racking with the first latching tooth 126 of the locking device 120, when the circuit breaker 10 is in the drawn-out position. This results in an additional one-way latching 178 which has to be released by the hand-grip 130 to allow the circuit breaker 10 to be extracted from the chassis 14.

Figure 19:
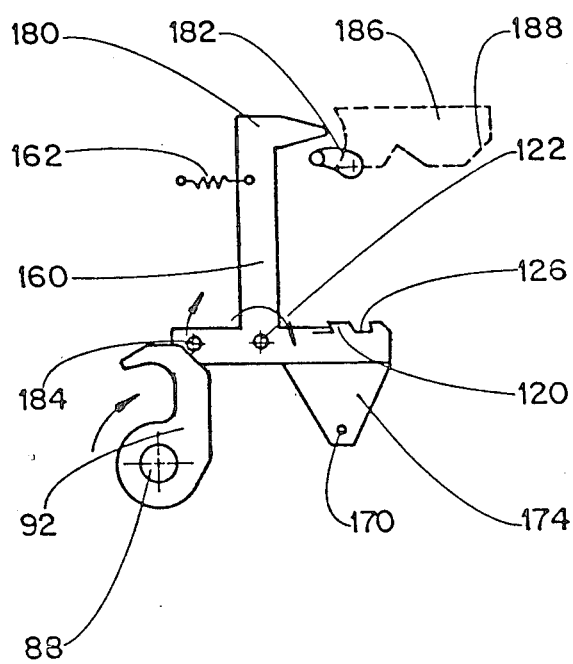
FIG. 19 represents a side view of the operating lever when a forced trip takes place during circuit breaker draw-out.
Figure 20:
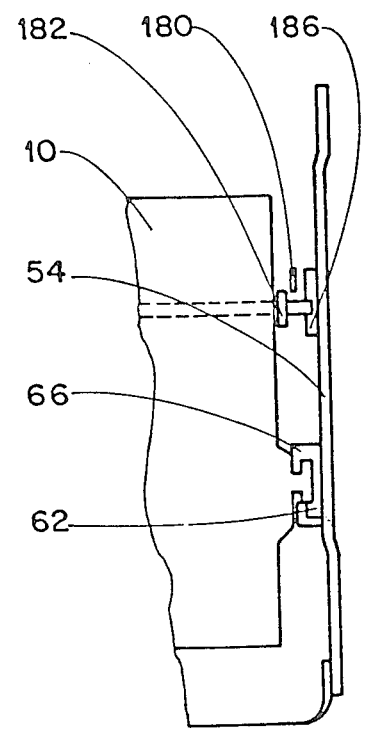
FIG. 20 is an elevational view of the device according to FIG. 19.

Referring now to FIGS. 19 and 20, the upper arm 180 of the operating lever 160 is capable of actuating the trip bar 182 of the circuit breaker 10 to the tripped position in the course of the clockwise pivoting of the lever 160. This mechanical action of the lever 160 causes a first forced trip of the operating device 18 when the mechanism 78 with a handle 84 moves the circuit breaker 10 from the drawn-in position to the drawn-out position. Pivoting of the operating lever 160 takes place during the rotation movement of the cam 92 whose upper edge interferes with a spindle 184 driving the lever 160.

A safety stop 186 (FIGS. 14, 19, 20) is securely united to the side wall 54 of the chassis 14, and comprises an oblique active face 188 designed to make the trip bar 182 pivot to the tripped position when the circuit breaker 10 is inserted in the chassis 14. This results in a second forced trip in the draw-in direction, when the closed circuit breaker 10 is moved in translation by the mechanism 78 from the drawn-out position to the drawn-in position.

According to an alternative embodiment, the operating lever 160 and the locking device 120 can be accomplished in an equivalent manner by means of a single part articulated on the spindle 122. This part, associated with the return spring 162 has a first function of mechanical latching of the circuit breaker 10 in the drawn-out position and in the drawn-in position, a second function of unlocking of the latches 126, 128 by means of the extraction hand-grip 130 or the cam 90, 92 of the shaft 88, and a third function of forced tripping of the circuit breaker 10 in the draw-out direction.

Figure 18:
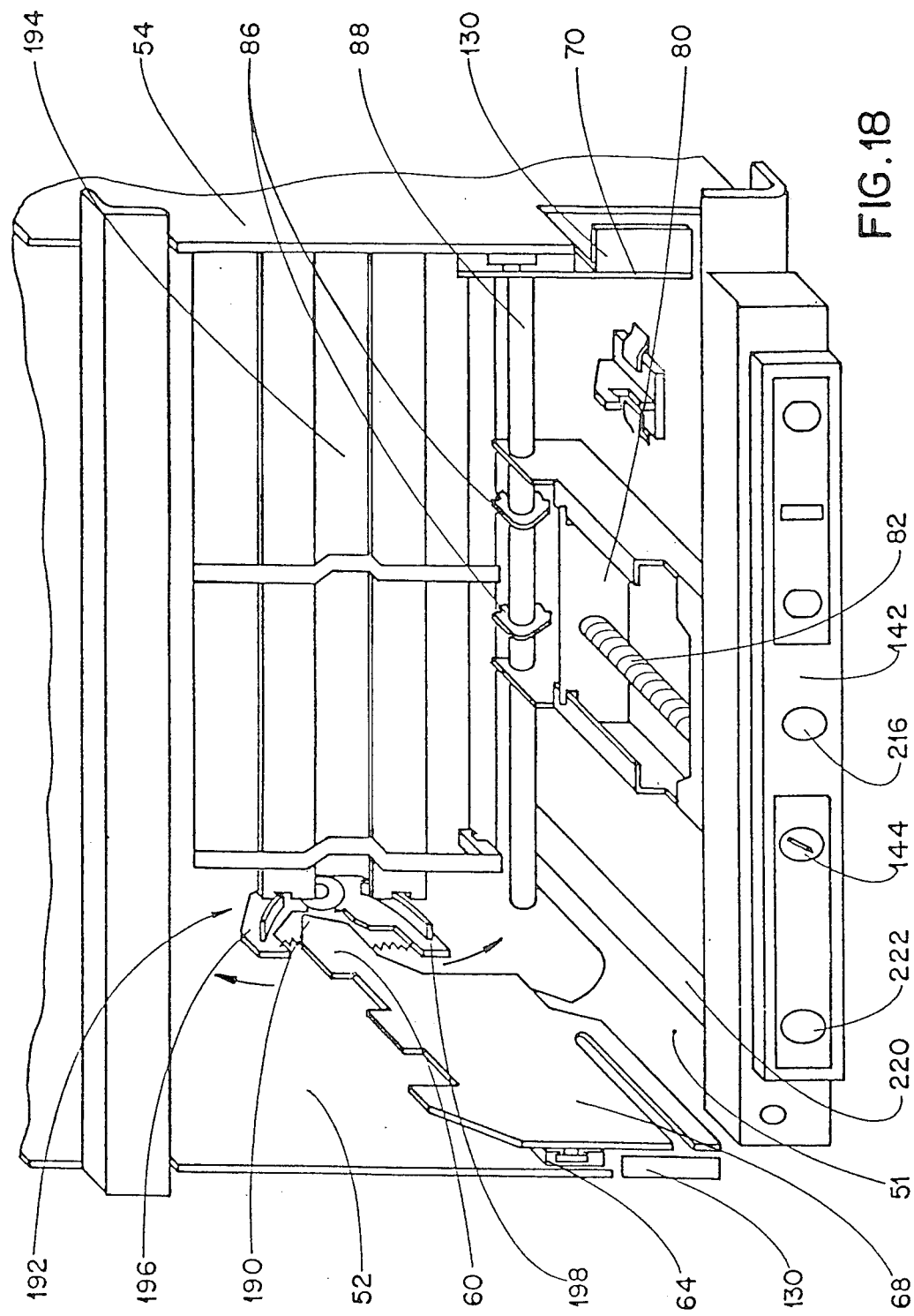
FIG. 18 shows a perspective view of the fixed chassis and of the racking mechanism after the circuit breaker has been removed.
Figure 22:
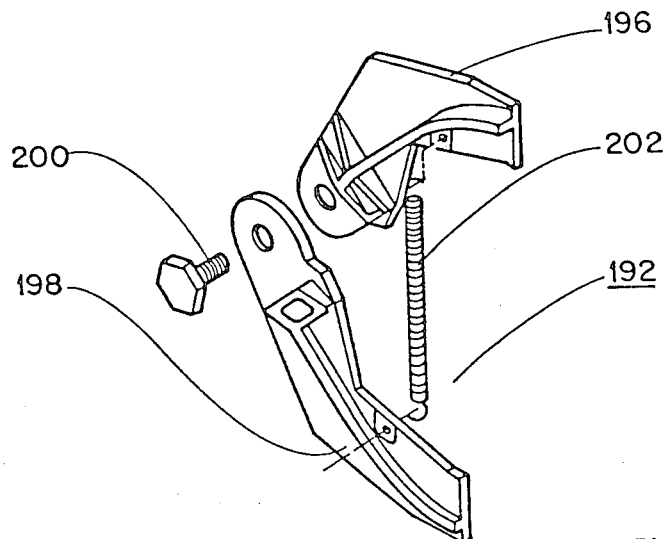
FIG. 22 represents a perspective view of the insulating shutters actuating device.
Figure 23:
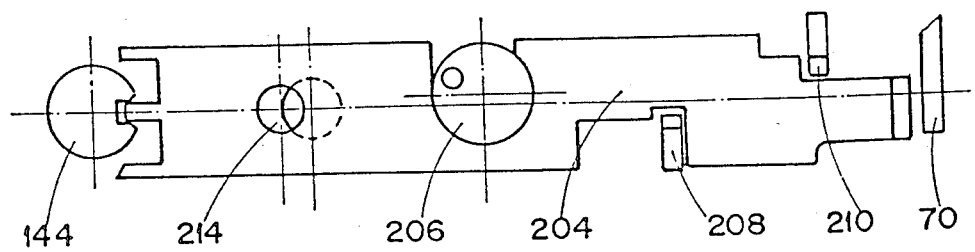
FIG. 23 is a detailed view of FIG. 13, showing the locking bolt associated with various safety devices.
Figure 24:
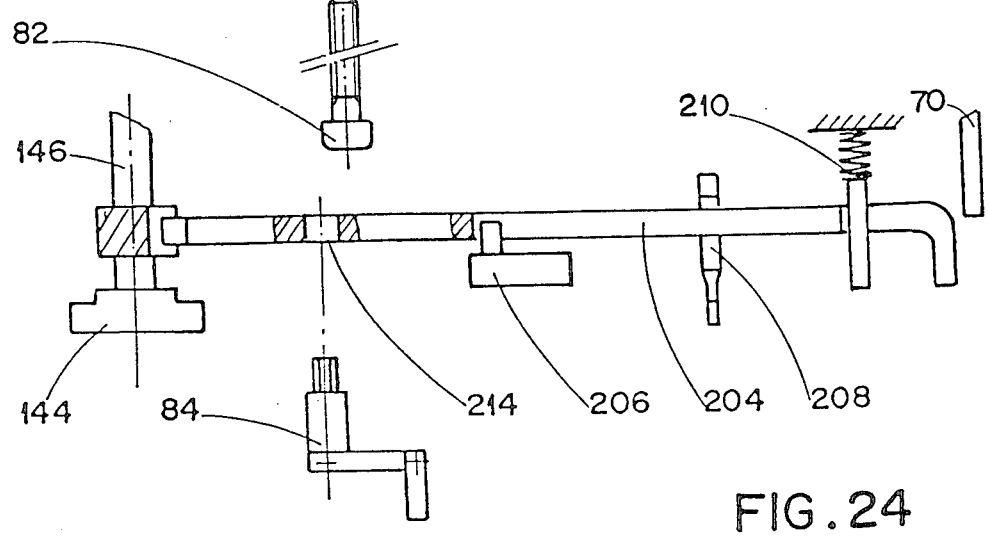
FIG. 24 is a plan view of FIG. 23, in the locking position of the locking bolt.

Referring now to FIG. 18, the rear end 190 of each rail 60, 62 is bevelled and cooperates with an actuating device 192 of the insulating shutters 194. In the drawn-out position of the circuit breaker 10, closing of the shutters 194 ensures isolation and prevents any contact with the pads 34, 36 of the connection support 32. One half of the actuating device 192 is shown in detail in FIG. 22 and comprises a pair of operating jaws 196, 198 articulated on a spindle 200 supported by the side wall 52 of the chassis 14. A return spring 202 biases the two jaws 196, 198 towards one another and urges the insulating shutters 194 closed in the draw-out direction of the circuit breaker 10. The other symmetrical half of the actuating device 192 is associated with the side wall 54 of the chassis 14. When the circuit breaker 10 is actuated by the racking mechanism 74 from the drawn-out position with test to the drawn-in position, the bevelled end 190 of each rail 60, 62 acts on the ramps of the operating jaws 196, 198 (see FIGS. 16, 18) and causes them to separate followed by automatic opening of the insulating shutters 194 so as to enable the draw-in to take place.

Referring now to FIGS. 13, 18, 23 and 24, a plurality of auxiliary safety devices are located in the front escutcheon 142 of the chassis 14 to monitor operation of the racking mechanism 74. These auxiliary devices comprise a main locking bolt 204 operating in conjunction with a first locking by means of a key-lock 206, a second locking by padlock 208, and a third locking 210 by opening the door 58. The main locking bolt 204 is formed by a locking flange in conjunction with a return spring 212. The flange has several retaining notches and can be moved transversely between a first locking position and a second unlocking position. The flange of the locking bolt 204 also comprises an orifice 214 for the handle 84 to pass through. In the second unlocking position of the locking bolt 204 (represented in FIG. 13), the orifice 214 is in longitudinal alignment with the operating screw 82 and the orifice 216 of the escutcheon 142, allowing the handle 84 to pass through. When the locking bolt 204 is retained in the first locking position by engagement of any one of the three locking devices 206, 208, 210, in the corresponding notches of the flange, the orifices 214 and 216 are no longer aligned (see FIGS. 23 and 24), in such a way as to prevent the handle 84 being inserted. The racking mechanism 74 cannot be actuated.

When the circuit breaker 10 is insufficiently pushed into the chassis 14 from the extraction position to the drawn-out position, the movable support flange 70 of the circuit breaker interferes with the lock bolt 204, and also prevents the handle 84 from being inserted.

Figure 13:
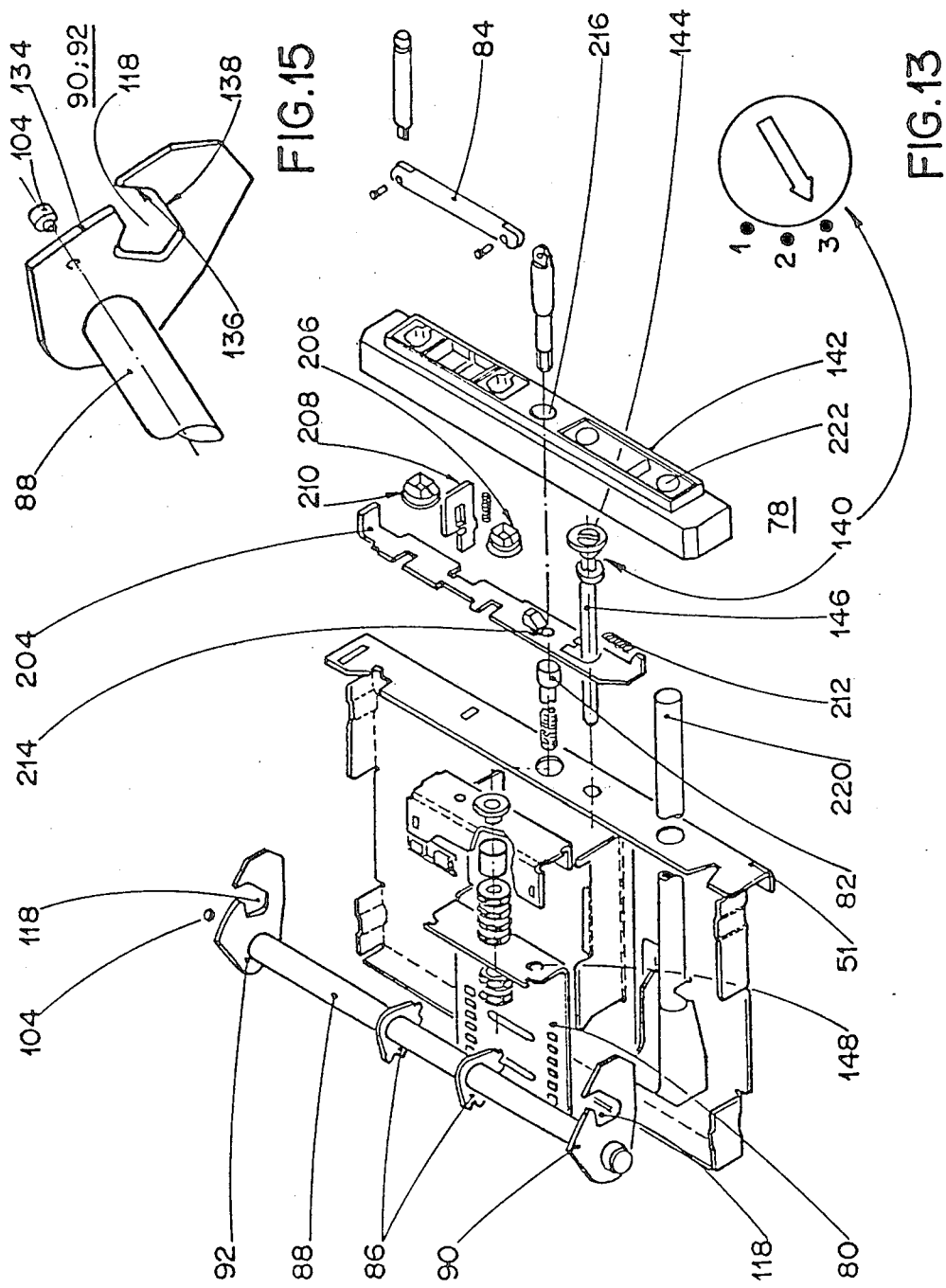
FIG. 13 represents an exploded perspective view of a part of the draw-in mechanism showing the crown-wheel actuating device.

There is securely fixed to the base plate 51 of the chassis 14 a sleeve 220 for storing the handle 84, which is articulated in three parts (see FIG. 13). The sleeve 220 extends parallel to the operating screw 82, and is aligned with an access orifice 222 arranged in the escutcheon 142. Storing the handle 84 in the fixed sleeve 220 is performed from the front of the chassis 14 when the door 58 is open or closed.

We claim:

1. A reversible draw-in and draw-out mechanism for an extractible multipole electrical circuit breaker, equipped with main circuits with terminals and auxiliary circuits associated with a connection device having fixed connectors and interacting movable connectors, the circuit breaker being mounted on a movable mechanical support inside a fixed chassis in the form of a housing having a front opening, two opposite side walls, and a fixed rear support panel for connection of the main terminals of each pole, the mechanical support of the circuit breaker being guided by means of a pair of slide plates symmetrically fixed to the side walls of the chassis, and extending parallel in the longitudinal draw-in direction, said mechanism comprising an operating device associated with a movement transmission system capable of occupying a first "drawn-in" position in which the main ad auxiliary circuits of the circuit breaker are connected, a second "test" position in which the main circuits are disconnected and the auxiliary circuits are connected, and a third "drawn-out"

position in which the main and auxiliary circuits are disconnected, wherein the fixed connectors of the auxiliary circuits connection device are securedly united to the circuit breaker and the movement transmission system of the reversible mechanism comprises a first mechanical link between the operating device and a drive device of the movable connectors of the connection device during the actuation phase corresponding to the interval provided between the second and third positions, and a second mechanical link between the operating device and a coupling device of the movable mechanical support of the circuit breaker during another actuation phase corresponding to the interval provided between the second and first positions, the assembly being arranged so that the first mechanical link is active when the second mechanical link is broken, and the second mechanical link is active when the first mechanical link is broken, thereby enabling the fixed and movable connectors of the auxiliary circuits to be connected or disconnected when the circuit breaker remains immobile.

2. A reversible draw-in and draw-out mechanism according to claim 1, wherein the circuit breaker is housed in an insulating case, and wherein:

said case is provided with opposite vertical side faces comprising latching devices positioned on the mechanical support, the fixed connectors of the connection devices are located on one of the upper or lower horizontal faces of the case, the movable circuit breaker mechanical support is equipped with a pair of rails capable of sliding in the corresponding slide plates of the chassis, the coupling device of the second mechanical link is disposed on a flange fixed to each rail.

3. A reversible draw-in and draw-out mechanism according to claim 1, wherein the drive device is arranged so as to cause a vertical translation movement of the movable connectors when the first mechanical link is made and the second mechanical link is broken, said movement being perpendicular to the longitudinal draw-in or draw-out direction of the main circuits of the circuit breaker, and the movable connectors of the connection device are supported by a cross-piece coupled to two symmetrical vertical rods of the drive device, and extending parallel to the horizontal face of the case on which the corresponding fixed connectors are located.

4. A reversible draw-in and draw-out mechanism according to claim 3, wherein the reversible mechanism operating device comprises:

an operating screw associated with a crown-wheel device cooperating with a transmission pinion keyed onto a rotating shaft, and at least one cam fixed to said shaft to control alternately the movable connector drive device and the mechanical support coupling device, said rotating cam having a pin capable of engaging in a groove arranged in an intermediate lever of the drive device when the first mechanical link is made, and a notch designed to drive the mechanical support coupling device when the second mechanical link is made.

5. A reversible draw-in and draw-out mechanism according to claim 4, further including:

a spindle securedly united to the corresponding side wall of the chassis;

each intermediate lever of the drive device being pivotally mounted on said spindle, and having said groove located at one end;

the other end of said intermediate lever being articulated on the corresponding vertical rod connected to the cross-piece of the drive device;

said cross-piece being inserted with clearance in a longitudinal slot arranged in an extension of each rod, the slot having a length corresponding to the circuit breaker draw-in and draw-out travel when the second mechanical link is made.

6. A reversible draw-in and draw-out mechanism according to claim 1, wherein the connection device comprises a first fixed connector linked with an electronic trip release of the circuit breaker, and a second fixed connector linked to electrical measuring, monitoring and indication auxiliaries.

7. A reversible draw-in and draw-out mechanism for an extractible electrical circuit breaker, equipped with main circuits with terminals and auxiliary circuits associated with a connection device, capable of occupying a first "draw-in" position in which the main and auxiliary circuits of the circuit breaker are connected, a second "test" position in which the main circuits are disconnected and the auxiliary circuits are connected, and a third "drawn-out" position in which the main and auxiliary circuits are disconnected, the circuit breaker being mounted on a movable mechanical support inside a fixed chassis in the form of a housing having a front opening, two opposite side walls, and a fixed rear support panel for connection of the main terminals of each pole, said mechanism cooperating with means of locking the circuit breaker in the drawn-in and drawn-out positions, wherein the movable circuit breaker mechanical support comprises:

a pair of symmetrical rails mounted with longitudinal sliding in the corresponding slide plates fixed to the opposite side walls of the chassis, the circuit breaker having at least one latching device positioned in an interacting device of each rail, a locking system equipped with a locking device operating in conjunction with rail retaining means to ensure mechanical locking of the circuit breaker in the slide plates in the drawn-in and drawn-out positions, said locking device being securedly united to an operating lever pivotally mounted on a spindle of the chassis, a first mechanical link between said operating lever and an extraction hand-grip, capable of causing unlatching of the locking system by unlocking the locking device and the retaining means, and a second mechanical link arranged between the operating device transmission system and said operating lever to ensure forced tripping of the circuit breaker when the mechanical support is moved from the drawn-in position to the drawn-out position.

8. A draw-in and draw-out mechanism according to claim 7, wherein the operating lever is associated with a return spring biasing said locking device in the locking direction, and the rail retaining means comprise a main latch and an auxiliary notch longitudinally staggered in relation to one another to form respectively a first positive two-way locking of the movable support when the circuit breaker reaches the drawn-in position, and a second one-way latching of said support in the drawn-out position preventing the circuit breaker from being extracted but allowing it to be drawn in, the operating lever comprising a pin cooperating with a ramp of the extraction hand-grip when the first mechanical link is made, and a spindle capable of being driven by a cam of the operating device when the second mechanical link is made.

9. A draw-in and draw-out mechanism according to claim 8, wherein each support mechanism rail comprises a flange on which the extraction hand-grip is mounted in translation, and having a coupling device capable of cooperating with said operating device cam, the rear end of each rail being bevelled to cooperate with an actuating device of an insulating shutter system, said device comprising a pair of operating jaws articulated on a spindle supported by a side wall of the chassis.

10. A draw-in and draw-out mechanism according to claim 7, having a plurality of auxiliary safety devices arranged in a front escutcheon of the chassis, and comprising:

a locking bolt comprising a movable flange having retaining notches, capable of cooperating by engaging with said auxiliary devices in a first locking position, in such a way as to prevent the operating device from being actuated, a first orifice through which a handle actuating the crown-wheel and screw operating device passes, said locking bolt being provided with a second orifice able to be aligned with the first interacting orifice of the escutcheon to enable the operating screw to be actuated by means of the handle in a second unlocking position of the flange, a fixed sleeve longitudinally aligned with a third orifice of the escutcheon for storing the handle articulated in several parts, one of the support mechanism flanges interfering with the locking bolt preventing the handle from being actuated when the circuit breaker is insufficiently pushed into the chassis from the extraction position to the draw-out position.

* * * * *